United States Patent [19]

Berchem

[11] Patent Number: 5,052,445
[45] Date of Patent: Oct. 1, 1991

[54] PIPE SECTION, ESPECIALLY FOR ABRASIVE AND/OR CORROSIVE MATERIAL PIPELINES

[75] Inventor: Rütger Berchem, Essen, Fed. Rep. of Germany

[73] Assignee: Metalpraecis Berchem+Schaberg Gesellschaft Fur Metallformgebung Mit Beschrankter**Haftung, Gelsehkirchen, Fed. Rep. of Germany

[21] Appl. No.: 589,089

[22] Filed: Sep. 27, 1990

Related U.S. Application Data

[62] Division of Ser. No. 369,993, Jun. 22, 1989, Pat. No. 4,995,427.

[30] Foreign Application Priority Data

Jun. 30, 1989 [DE] Fed. Rep. of Germany ....... 3821985

[51] Int. Cl.⁵ .............................. F16L 9/02; F16L 9/22
[52] U.S. Cl. ..................................... 138/155; 138/98; 138/110; 138/DIG. 6; 406/193
[58] Field of Search ................... 138/97, 98, 110, 140, 138/141, 143, 145, DIG. 6, 109, 155; 406/193

[56] References Cited

U.S. PATENT DOCUMENTS

| | | | |
|---|---|---|---|
| 751,454 | 2/1904 | Brown et al. | 138/DIG. 6 |
| 1,646,736 | 10/1927 | Mills | 138/DIG. 6 |
| 3,307,996 | 3/1962 | Keneipp | 138/DIG. 6 |
| 3,422,856 | 1/1969 | Hunter et al. | 138/DIG. 6 |
| 3,541,670 | 11/1970 | McCrory | 138/155 |
| 3,907,049 | 9/1975 | Baffas | 138/155 |
| 4,366,971 | 1/1983 | Lula | 138/DIG. 6 |
| 4,386,629 | 6/1983 | Cook et al. | 138/DIG. 6 |
| 4,496,499 | 1/1985 | Brittain et al. | 138/98 |
| 4,691,740 | 9/1987 | Suetlik et al. | 138/109 |
| 4,848,407 | 7/1989 | Smith et al. | 138/97 |

*Primary Examiner*—James E. Bryant, III
*Attorney, Agent, or Firm*—Herbert Dubno

[57] ABSTRACT

A pipe section of an outer metallic pipe and a nonmetallic inner lining is provided so that the lining can be removed. To this end, the lining consists of lining segments, the terminal members of which are braced against the ends of the pipe in a form fitting manner and the successive lining segments can interfit with, for example, complementary frustoconical formations.

1 Claim, 2 Drawing Sheets

PIPE SECTION, ESPECIALLY FOR ABRASIVE AND/OR CORROSIVE MATERIAL PIPELINES

CROSS REFERENCE TO RELATED APPLICATIONS

This application is a division of Ser. No. 07/369,993 filed June 22, 1989 (now U.S. Pat. No. 4,995,427) and is related to the commonly assigned copending applications: Ser. No. 07/247,113 filed Sept. 20, 1988 (U.S. Pat. No. 4,838,312); Ser. No. 07/307,383 filed Feb. 6, 1989 (U.S. Pat. No. 4,932,432) and Ser. No. 07/316,755 filed Feb. 28, 1989 (U.S. Pat. No. 4,936,546).

Reference can also be made to the following patents on similar subjects: U.S. Pat. No. 4,795,133 issued Jan. 3, 1989; U.S. Pat. 4,791,953 issued Dec. 20, 1988; U.S. Pat No. 4,771,803 issued Sept. 20, 1988 and Pat. No. 4,815,704 issued Mar. 28, 1989.

FIELD OF THE INVENTION

My present invention relates to a pipe section, especially for pipe carrying abrasive material and fluids which can be either corrosive or noncorrosive. More particularly, the invention relates to a lined pipe section, i.e., a pipe section comprising an outer metallic pipe member forming an outer shell and a wear-resistant nonmetallic lining disposed within this shell.

BACKGROUND OF THE INVENTION

Lined pipelines generally have a metallic pipe or tube whose inner surface is bonded to a nonmetallic lining material which can be corrosion-resistant and wear-resistant.

As used herein, "wear-resistant" is intended to both abrasive and/or corrosive attack. A pipe section according to the invention will be considered to be a length of piping which can be formed at its ends with means enabling it to be connected to other pipe sections and fittings to form the pipe-line and having a certain length. Generally, in the pipelines with which the invention is concerned, an abrasive or simultaneously abrasive and corrosive fluid medium will be conducted through the pipeline.

The pipe length or section can be connected to other sections to form the pipeline by welding or can have flanges so that a flange connection can join the pipe sections together.

Pipe sections have been fabricated heretofore, as has already been noted, with a lining of nonmetallic material bonded fixedly to the inner surface of the outer shell or pipe which can be composed of a metallic material.

The nonmetallic material forming the lining is, of course, selected to resist the abrasive and/or corrosive stresses or attack which may be applied by the following medium. For example, the lining may be an appropriate plastic or synthetic resin material. Linings of basalt or other inorganic material may also be used and various forms of internally coating the metallic pipe lengths with the lining material may be employed.

Lined pipe sections can be used for the displacement of bulk materials, e.g., for the blowing of bulk fillers into chambers or compartments of subterranean structures in mining or the like.

Notwithstanding the protection by a lining resistant to erosion, substantial wear of the lining does occur with time. This, of course, eliminates the useful life of the pipe section.

When the lining wears beyond a certain point, the entire piping section must be removed and discarded.

Obviously, this approach is expensive, especially when the lining material itself and the form in which it is applied to the pipe section are expensive or involve expensive processes.

In certain cases, wear-resistant materials which have been found to be particularly effective for the handling of highly abrasive bulk materials, for example, certain industrial ceramics and especially nonadhesive synthetic resins used as lining material utilizing conventional techniques, could not be employed in prior art systems.

OBJECTS OF THE INVENTION

It is the principal object of the present invention to provide a pipe section having an outer metallic pipe length and a wear-resistant nonmetallic lining which will avoid drawbacks or earlier systems of the type described.

Another object of this invention is to provide a piping length having an outer metallic pipe and wear-resistant nonmetallic lining which will permit replacement of this lining after it has been subjected to a certain amount of wear and wherein the replacement can be effected simply and economically.

Yet another object of the invention is to provide a piping section which enables the use of wear-resistant lining material which have not, for structural reasons, been capable of being used effectively heretofore.

SUMMARY OF THE INVENTION

These objects and others which will become apparent hereinafter are attained, in accordance with the present invention by providing the lining of a multiplicity of tubular lining segments each of which is shorter than the metallic pipe sections in which the segments are provided and in which the segments are disposed end to end so as to collectively extend the full length of the pipe section, the lining having at least one terminal lining section form fittingly placed against the respective end of the outer pipe.

The resulting pipe section can be so incorporated into a pipeline that the braced end of the succession of lining segments cannot shift out of or in the outer pipe member by the manner in which the outer pipe member is connected to the next pipe member of the pipeline. Upon separation of the pipe section from the pipeline, however, the segments can be slipped out and replaced.

Preferably such form-fitting bracing of terminal lining segments can be provided at both sides each of the junction and at both ends of the pipe sections. For example, a terminal segment may be formed with an outwardly extending collar which can be placed against the collar of a terminal segment of and adjoining pipe section connected to form the pipe-line with the first pipe section, or can abut an end face of the outer pipe to provide the bracing. The pipe lining segments can abut one another end to end in planes perpendicular to the axis of the pipe section or successive lining segments can have mating configurations, e.g. complementary frustoconical configurations.

To brace the lining segments of at least one and preferably both of the terminal segments, it is advantageous to provide the outer pipe with an annular groove into which the collar fits substantially flush.

The terminal lining segments of adjoining pipe sections can then be pressed against one another at the point which is formed, e.g, by welding or by a flange connection of the pipe sections.

The lining can be constituted of various materials, including materials which are highly brittle and deformable. For example, glass can serve as a suitable lining material.

The pressure sensitivity of the lining can be eliminated by allowing a pressure balance across the wall of the lining segments by permitting the flowable medium to lie on opposite sides of the wall at substantially the same pressure. This can be achieved by leaving gaps between adjoining lining segments in each pipe section.

In this connection, it is a preferred embodiment of the invention to provide spacers between the outer surface of each lining segment and the inner surface of the inner wall of the metallic outer pipe. Such spacers can be in the form of longitudinally extending ribs molded onto the lining segments and engaging the inner surface of the metal pipe.

The lining segments can be composed of industrial ceramic, from glass or even from synthetic resin materials. In the case of pipelines in which there is flow of abrasive medium, but medium is noncorrosive, it suffices to make the outer pipe from conventional pipemaking steels. When, of course, an abrasive and also corrosive medium is intended to transverse the pipe section, the outer pipe can also be composed of conventional pipemaking steel, although the inner surface of the pipe may then be lined, in accordance with the invention with an anticorrosion coating. The anticorrosion coating, which is a chemically or galanically applied protective layer effective against corrosion, can be selected based upon the nature of the corrosive material. The anticorrosion coating suffices to protect the metal pipe even when abrasive materials traverse the passage surrounded by the lining, since high velocity flow of abrasive fluid does not contact this coating.

The piping element of the invention, for connections in a pipe line thus can comprise:
an outer pipe section of the metallic material having ends connectable in a pipeline; and
an inner lining extending substantially over the entire interior length of the outer pipe section and formed by a plurality of the tubular lining segments disposed end to end in the outer pipe section, composed of a nonmetallic material and removably disposed in the outer pipe section, the segments each being shorter than the outer pipe section, the segments including terminal segments at opposite ends of the lining formfittingly engaging and braced againts respective ends of the outer pipe section.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

The pipe section of the invention comprises a metallic outer pipe 1 and an inner wear-resistant nonmetallic lining.

Figure 1:
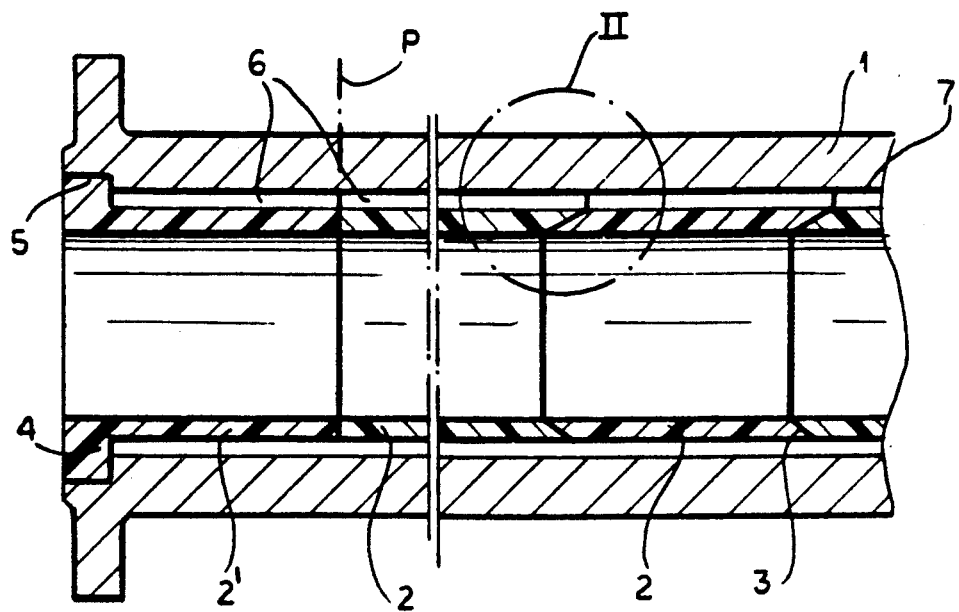
FIG. 1 is a longitudinal section (axial section) through a piping section according to the invention, partly broken away.
Figure 2:
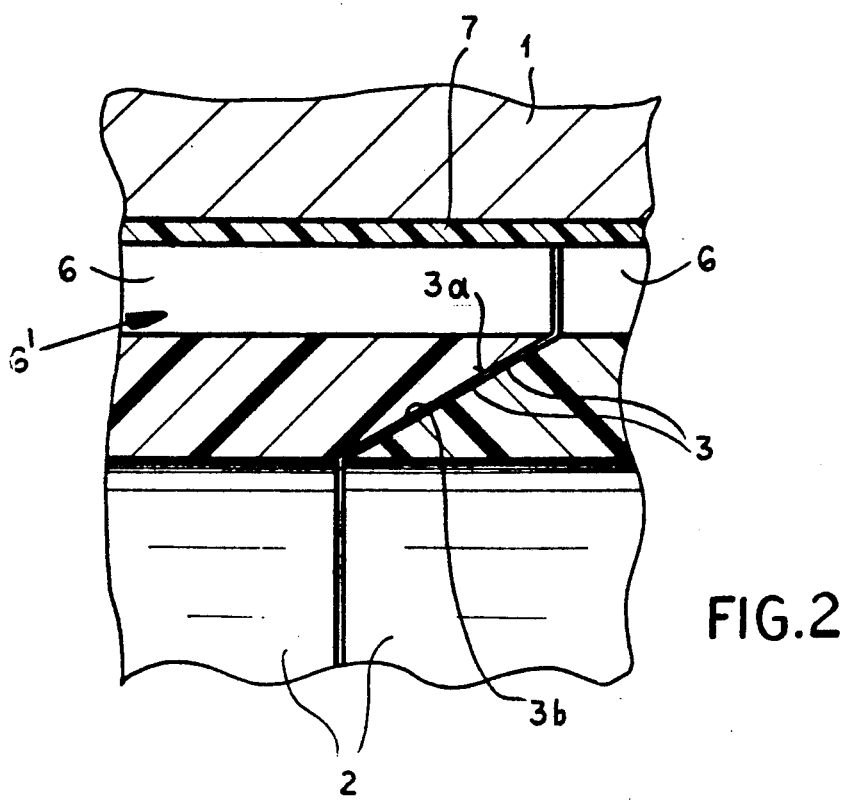
FIG. 2 is a detail of the region II of FIG. 1.

As can be seen from FIGS. 1 and 2, the lining consists of a plurality of tubular lining segments 2, each of which is shorter than the outer pipe 1 and all of which are received in end-to-end relationship in the outer pipe 1.

At least at one end, the terminal lining segment 2' is braced against the end of the outer pipe 1 and form fittingly engages it. In the embodiment illustrated, the terminal lining segment 2' and the proximal lining segment 2 abut one another with contact substantially in a transverse plane P.

The remaining lining segments interfit by complementary frustoconical formations. These formations include female formations 3a and male formations 3b together can define small gaps or clearances (FIG. 2). The terminal segments 2' are provided with outwardly extending circumferential collars 4 which are received in respective annular grooves 5 in close-fitting or snug relationship.

In the embodiment illustrated, moreover, the gaps 3 permit fluid to enter spaces 6' formed around the lining segments and inwardly of the outer pipe 1 so that pressure equalization is provided across the walls of the lining segments.

Figure 3:
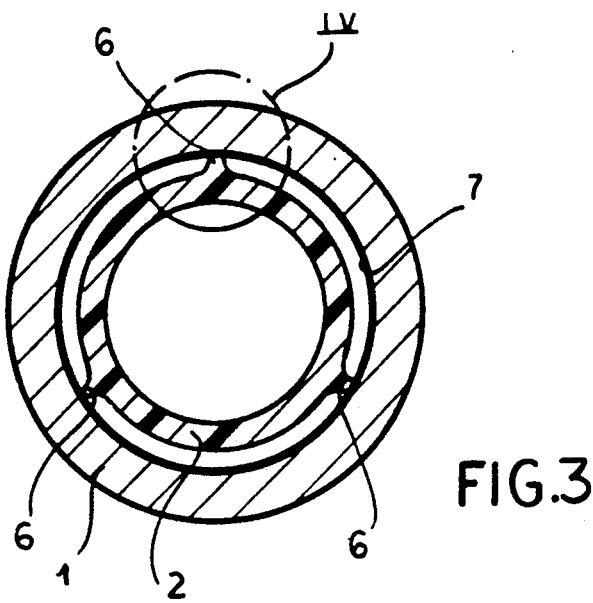
FIG. 3 is a transverse cross section through the piping section of FIG. 2.
Figure 4:
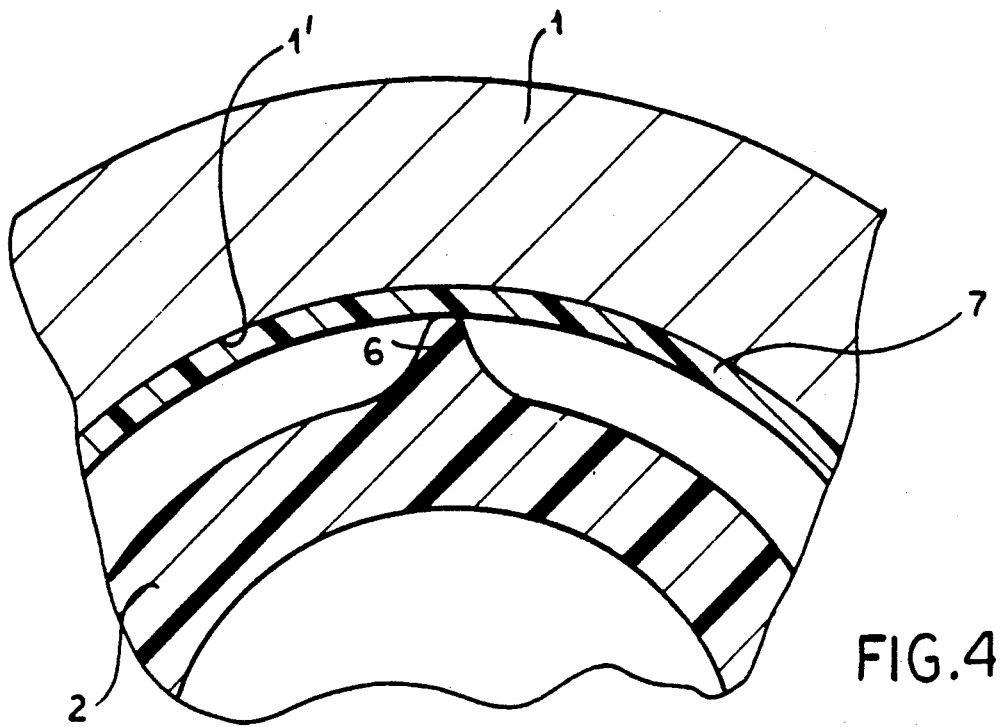
FIG. 4 is a detail of region IV of FIG. 3.

The lining segments are also braced with equispaced ribs 6, shown in cross section in FIGS. 3 and 4. These three angularly equispaced ribs extend longitudinally or axially along the respective pipe segments. The pipe segment 2 can be composed of an industrial ceramic, glass or synthetic resin material and other materials can be used as well.

As can be seen from FIGS. 3 and 4, when an abrasive and corrosive medium is being conducted through the pipe line, the inner surface 1 of the outer pipe 1 can be provided with a corrosion-preventing coating 7 which can be chemically or galvanically applied. This coating can be a synthetic resin, lacquer or paint or a metallic coating.

When, of course, the medium transported through the pipe line is noncorrosive but is abrasive only, the coating 7 can be omitted.

I claim:

1. A piping length for a pipeline for a flowable abrasive and corrosive medium carrying a bulk material, comprising:
an outer pipe section of metallic material having ends connectable in a pipeline and formed with an inner surface; and
an inner lining formed with an outer surface spaced from said inner surface and extending substantially over the entire interior length of said outer pipe section, said inner lining being formed by a plurality of tubular lining segments disposed end to end in said outer pipe section composed of a ceramic material and removably disposed in said outer pipe section, each pair of adjacent lining segments forming a respective clearance therebetween, so that the medium from an interior of the pipeline enters through said clearances into a space defined between an outer surface of said lining and an inner surface of said outer pipe section, said segments each being shorter than said outer pipe section, said segments including terminal segments at opposite ends of said lining formfittingly engaging and braced against respective ends of said outer pipe section, said outer pipe section being a steel pipe and being internally provided with an anti-corrosion coating interposed between said metallic material and said lining, said anti-corrosion coating being a galvanically-applied protective layer.

* * * * *